Patented May 24, 1927.

1,629,557

UNITED STATES PATENT OFFICE.

HAROLD W. WALKER, OF EDGEWOOD, MARYLAND.

MANUFACTURE OF ARSENATE INSECTICIDES.

No Drawing.     Application filed May 14, 1926. Serial No. 109,162.

This invention relates to the manufacture of arsenate insecticides; and it comprises a method of producing calcium arsenate either as particles thereof or as film or layer coatings on particles of calcium carbonate, wherein calcium carbonate is treated with the appropriate amount of $As_2O_3$ and heated to form first calcium arsenite and later, by oxidation, calcium arsenate; the proportions being such, in most cases, as to produce granules of unchanged calcium carbonate covered by a superficial coating of calcium arsenate; and it further comprises as a new material for insecticidal purposes a granular or powdery material with the particles carrying a superficial layer of calcium arsenate and a core of calcium carbonate; all as more fully hereinafter set forth and as claimed.

Calcium arsenate has come into favor as insecticide. For this purpose, it is wanted as a very fine powder, as light in specific gravity as possible. And it is wanted in a dilute form, for the reason that it is impracticable to distribute on a leaf only the small amount of arsenate that is required, as a rule, for insecticidal purposes, no matter how fine the state of comminution. The requirement for dilution is generally met by physical admixtures of inert powders of one kind or another; but they are not satisfactory. Nor is it easily practicable to produce the particular calcium arsenate wanted in a cheap and economical way. Most of the methods of manufacture are relatively expensive. Attempts have been made in the prior art to secure dilution and economy in manufacture by oxidizing $As_2O_3$ in the presence of an excess of caustic lime; the excess serving as a diluent and a filler. Unfortunately, this results in the production of various basic arsenates, rather than the normal arsenate $Ca_3(AsO_4)_2$.

In the present invention I produce the normal arsenate cheaply and economically by heating reactive calcium carbonate in the presence of $As_2O_3$, the temperature however not being carried high enough to produce $CO_2$ and free base by thermal dissociation. For my purposes, I find best adapted various calcium carbonate sludges produced industrially. Using dense native calcium carbonate in the form of limestone, there is a loss of arsenic and the product is denser than is wanted. Chalk and other light forms of ground limestone can be used but, as stated, I find it better to use reactive precipitated forms of calcium carbonate. For the present purposes, magnesium carbonate is the equivalent of calcium carbonate and I can use precipitates made with dolomitic limes as well as those made with a high calcium lime. Barium carbonate may be used in conjunction with or in lieu of calcium or magnesium carbonate. The temperature at which $CO_2$ is thermally liberated with barium carbonate is higher than with calcium carbonate and that in turn is higher than with magnesium carbonate.

I have found that if calcium carbonate is heated with $As_2O_3$, the latter displaces $CO_2$ to a sufficient extent to make a normal arsenite, without formation of more basic arsenites. High temperatures liberating $CO_2$ and setting free lime lead to formation of these basic arsenites; and such temperatures are avoided. On further heating the normal arsenite in the presence of air, it goes over smoothly and completely into the normal arsenate. If the amount of $As_2O_3$ present is sufficient to convert all the calcium carbonate into arsenite and arsenate, a pure product results. On the other hand, if the amount of calcium carbonate is larger, the particles acquire a coating of arsenite and then arsenate, while the core of the particle remains in its original condition, being calcium carbonate. As will be perceived, by using an excess of calcium carbonate in this reaction, I can provide a convenient and economical method of producing arsenate compositions containing the arsenic as normal arsenate and of any degree of dilution desired. Also, I can produce a composition of unusually low apparent specific gravity, since I can employ light and, relatively, fluffy carbonate. In working with precipitated calcium carbonate and with some forms of calcium carbonate which can be produced by gassing or air slacking quicklime, the utilization of the arsenic is practically quantitative. In working with powdered limestone of hard and dense character, there is often a substantial loss of $As_2O_3$ by volatilization before the chemical reactions I desire set in and fix the arsenic.

In practicing the present process, arsenic in a suitable form which may be commercial white arsenic, $As_2O_3$, is brought into contact with the calcium carbonate in the desired proportion in the dry way or the wet way. Each has its advantages for some purposes. In operating in the dry way, the required amount of white arsenic is placed in the bottom of a kettle-like apparatus and the desired amount of calcium carbonate placed above it. They may be rough mixed but I prefer superimposing the calcium carbonate on the arsenic. On now heating, the arsenic sublimes and is taken up superficially and held by the calcium carbonate. Where merely a superficial coating of arsenite and arsenate is wanted, a short heating is all that is necessary. Where a preparation containing a high percentage of arsenic is wanted, heating must be long enough to allow penetration of the arsenic vapors through the superficial films at first formed. In operating in the wet way, I dissolve the proper amount of white arsenic in sufficient hot water to form a thick slurry with the fine ground calcium carbonate used and afterwards dry the mixture. Operating in either way and making a preparation in which the particles are composed of or are coated with calcium arsenite, the preparation is next heated in the presence of air to a temperature somewhat below that required for calcining calcium carbonate. The particular temperature used varies somewhat with the apparatus and the circumstances, but it is somewhere between 500° and 800° C. Generally, I heat to a temperature around 650° C. At the latter temperature, there is but little tendency for the evolution of $CO_2$, even with a rapidly changing atmosphere. At 800° C., care must be taken to avoid removal of $CO_2$ by simple calcination of the calcium carbonate. At 500° C., there is no tendency to lose $CO_2$ by heating, but the oxidation reactions I desire go on but slowly. I find that by heating $As_2O_3$ and calcium carbonate in the way described, using a reactive form of calcium carbonate, I can secure frequently over 99.5 per cent conversion of trivalent arsenic into pentavalent arsenic, that is, of $As_2O_3$ into calcium arsenate, with less than 2 per cent loss of arsenic. And the product is a normal arsenate substantially free of basic arsenates or caustic lime.

The temperatures described are those useful in working with calcium carbonate. In using calcium carbonate made from dolomitic limestone and containing magnesium carbonate the temperatures must be lowered somewhat because of the lower temperature at which $CO_2$ is extricated. I desire no thermal change in the carbonate. With barium carbonate there is no substantial loss of $CO_2$ at any working temperature.

While I have stated two ways of causing reaction between $As_2O_3$ and the carbonate to form a superficial coating of an arsenite which is then converted into arsenate, yet other mechanical ways of effecting the result desired can be employed. For example, in large scale working the carbonate and the arseniferous material may be heated together in any suitable furnace chamber in which the vapors of the arsenic can come into contact with the carbonate particles at a temperature too low to drive off $CO_2$. Or, the white arsenic and the carbonate may travel together down a rotary inclined kiln, be dropped down a shaft-and-shelf furnace, etc. The formation of the arsenite may take place in one period of travel and the oxidation of the arsenite to arsenate take place in another. Vapors of arsenic and air may pass in countercurrent to particles of calcium carbonate.

While the process described may be used for making pure arsenate, I find it generally expedient in making commercial insecticides to provide for retention of much of the calcium carbonate unchanged. I have found by experience that preparations made under the present invention carrying as low as 10 to 20 per cent actual arsenic are quite as effective as an insecticide, as the pure arsenate and are very much easier to handle and distribute on the plant. Much depends upon the sensitivity of the plant and of the insect to be killed. They are, of course, also considerably cheaper, but a more important point is the greater ease of distribution on the leaf of the amount of arsenic actually wanted; neither more or less. Preparations made under the present invention are not basic and carry substantially no free lime. Basic arsenates are less toxic as a stomach poison to the boll weevil than are the normal arsenates or the acid arsenates and are as injurious to the plant as the acid arsenates. The acid arsenates are rather too soluble and injure the plant, while the basic arsenates are also injurious to the cotton plant. The present preparations contain no free lime and do not heat upon the addition of water. On treatment with hydrochloric acid, an amount of $CO_2$ is evolved equivalent to the calcium present in excess of the amount required to form normal calcium arsenate.

Instead of directly using prepared $As_2O_3$ (commercial white arsenic) arseniferous materials, capable of forming $As_2O_3$ in situ may be used, such as $As_2S_3$, orpiment, realgar, scorodite, arseno pyrite, arsenical flue dust etc.

What I claim is:—

1. The process of making calcium arsenate which comprises treating particles of reactive calcium carbonate with $As_2O_3$ and heating the materials in the presence of air until the arsenite formed is converted into arsenate, the temperature and conditions of heating being such as to preclude substantial calcination of said calcium carbonate.

2. The process of making calcium arsenate which comprises treating particles of reactive calcium carbonate with $As_2O_3$ and heating the materials in the presence of air until the arsenite formed is converted into arsenate, the temperature and conditions of heating being such as to preclude substantial calcination of said calcium carbonate, and the proportion of $As_2O_3$ being insufficient to react with all the calcium carbonate.

3. The process of making arsenates for insecticidal purposes which comprises treating particles of a reactive carbonate with $As_2O_3$ and heating the materials in the presence of air until the arsenite formed is converted into arsenate, the temperature and conditions of heating being such as to preclude substantial calcination of said carbonate.

4. As a new insecticidal composition, a powdery product containing calcium carbonate and normal calcium arsenate, said arsenate existing as an exterior layer and said calcium carbonate as a core.

5. The process of making calcium arsenate which comprises treating particles of reactive calcium carbonate with arsenic-containing material capable of producing arsenites in situ and heating the materials in the presence of air until the arsenite formed is converted into arsenate, the temperature and conditions of heating being such as to preclude substantial calcination of said calcium carbonate.

6. The process of making calcium arsenate which comprises treating particles of reactive calcium carbonate with arsenic containing material capable of producing arsenites in situ and heating the materials in the presence of air until the arsenite formed is converted into arsenate, the temperature and conditions of heating being such as to preclude substantial calcination of said calcium carbonate, and the proportion of $As_2O_3$ being insufficient to react with all the calcium carbonate.

7. The process of preparing and making arsenates for insecticidal purposes which comprises treating particles of a reactive carbonate with arsenic containing material capable of producing arsenites in situ and heating the materials in the presence of air until the arsenite formed is converted into arsenate, the temperature and conditions of heating being such as to preclude substantial calcination of said carbonate.

In testimony whereof, I have hereunto affixed my signature.

HAROLD W. WALKER.